US008225304B2

(12) United States Patent
Shahindoust et al.

(10) Patent No.: US 8,225,304 B2
(45) Date of Patent: Jul. 17, 2012

(54) SYSTEM AND METHOD FOR REMOTELY SECURING SOFTWARE UPDATES OF COMPUTER SYSTEMS

(75) Inventors: Amir Shahindoust, Laguna Niguel, CA (US); Michael Yeung, Mission Viego, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 795 days.

(21) Appl. No.: 12/352,008

(22) Filed: Jan. 12, 2009

(65) Prior Publication Data

US 2009/0138870 A1 May 28, 2009

Related U.S. Application Data

(63) Continuation-in-part of application No. 10/806,960, filed on Mar. 23, 2004, now Pat. No. 7,478,383.

(51) Int. Cl.
*G06F 9/445* (2006.01)
(52) U.S. Cl. ........................................ 717/172; 717/177
(58) Field of Classification Search .................... None
See application file for complete search history.

(56) References Cited

U.S. PATENT DOCUMENTS

| | | | |
|---|---|---|---|
| 5,155,847 A | 10/1992 | Kirouac et al. |
| 5,752,042 A | 5/1998 | Cole et al. |
| 5,870,610 A | 2/1999 | Beyda |
| 5,919,247 A | 7/1999 | Van Hoff et al. |
| 5,960,204 A | 9/1999 | Yinger et al. |
| 6,006,034 A | 12/1999 | Heath et al. |
| 6,151,643 A | 11/2000 | Cheng et al. |
| 6,167,567 A | 12/2000 | Chiles et al. |
| 6,199,204 B1 | 3/2001 | Donohue |
| 6,256,668 B1 | 7/2001 | Slivka et al. |
| 6,282,709 B1 | 8/2001 | Reha et al. |
| 6,282,711 B1 | 8/2001 | Halpern et al. |
| 6,347,398 B1 | 2/2002 | Parthasarathy et al. |
| 6,457,076 B1 | 9/2002 | Cheng et al. |

(Continued)

OTHER PUBLICATIONS

Daniel Mettler, "Secure Software Updates for Mobile Devices," Jul. 12, 2002, Sept. of Information Technology—University of Xurich, pp. 1-34.

*Primary Examiner* — Chuck Kendall
(74) *Attorney, Agent, or Firm* — SoCal IP Law Group LLP; Steven C. Sereboff; Jonathan Pearce (57) ABSTRACT

The subject application is directed to a system and method for providing a subscription service wherein a remote host enables the automatic receipt at a customer site of the most recent updates, patches, or fixes for services the customer site is running. The remote host uses a secured private port to transfer the updates to the subscribed systems. A remote host server searches an update database for updates of the services from a list configured by an administrator. The host server then downloads the updates and notifies the administrator that an update is available. An update script is subsequently generated, allowing the update to be pushed to a subscribing system. The host server the searches a listing of subscribing systems to determine which subscribing systems run a service for which an update is available. The host server, through a private port, uploads the content to the subscribing system automatically. The communication port is a secured port that will require authentication of the host server by the subscribing system prior to uploading.

16 Claims, 5 Drawing Sheets

U.S. PATENT DOCUMENTS

| | | |
|---|---|---|
| 6,477,703 B1 | 11/2002 | Smith et al. |
| 6,493,871 B1 | 12/2002 | Welch et al. |
| 6,546,492 B1 | 4/2003 | Walker et al. |
| 7,478,383 B2 * | 1/2009 | Shahindoust et al. ........ 717/172 |
| 2002/0100036 A1 | 7/2002 | Moshir et al. |
| 2003/0016959 A1 | 1/2003 | Fujikura et al. |
| 2003/0023963 A1 | 1/2003 | Birkholz et al. |
| 2003/0028869 A1 | 2/2003 | Drake et al. |
| 2003/0031029 A1 | 2/2003 | Kawaai et al. |
| 2003/0145317 A1 | 7/2003 | Chamberlain |
| 2003/0192041 A1 | 10/2003 | Mentze et al. |
| 2004/0003266 A1 | 1/2004 | Moshir et al. |
| 2004/0044999 A1 | 3/2004 | Gibson |

* cited by examiner

SYSTEM AND METHOD FOR REMOTELY SECURING SOFTWARE UPDATES OF COMPUTER SYSTEMS

CROSS-REFERENCE TO RELATED APPLICATIONS

This application is a continuation-in-part of U.S. patent application Ser. No. 10/806,960, titled A System and Method for Remotely Securing Software Updates of Computer Systems, filed Mar. 23, 2004 now U.S. Pat. No. 7,478,383.

BACKGROUND OF THE INVENTION

This invention is directed to a system and method for remotely securing software updates for computer systems. More particularly, this invention is directed to a system and method for providing software updates and patches to remote computers and other data processing devices.

Security is an important issue for computer users as it pertains to their computers, networks, and related products. Computer users want to ensure that their computers and software products are secure from hackers, viruses, and similar types of problems. Computers and the software products used therein must be monitored constantly for such security breaches. In addition, new technology and methods are always being developed to invade computers and related software products. Therefore, software updates, patches, and fixes must be developed to prevent such breaches and then provided to the computer user. Typically to obtain such updates, the computer user must visit the computer or software company's website to obtain the update. This requires the user to have knowledge that the update exists and then have the ability to obtain and download the update. Often computer users are not aware of such updates or do not know how to obtain such updates. In addition, if the user uses several different software products, the user must visit the website for each product and obtain the update for each product.

SUMMARY OF THE INVENTION

In accordance with one embodiment of the subject application, there is provided a system and method for updating security software of computer systems via a remote software update source. A primary server stores software updates representing at least one update of software associated with at least one data processing device. Installation scripts are then received by primary server, each script associated with an update on the primary server. Remote proxy server data is then stored on the primary server in a secure data storage corresponding to each remote proxy server. Specific registration data is then received by the primary server from each of the remote proxy servers and inclusive of data associated data processing devices associated with the proxy servers. The registration data includes authentication credentials for establishing a secure data communication path between the primary server and each of the remote proxy servers, identification data corresponding to identification of software of the data processing devices associated with the specific remote proxy server, update parameter data corresponding to specified timing of software updates, and data corresponding to selective manual and automatic installation of software updates. A login request is then received by the primary server from a remote proxy server and compared with the proxy server data. The primary server is then selectively placed in secure data communication with the requesting proxy server in accordance with the comparison, wherein a secure data communication channel is established in accordance with the registration data. Stored updates are then tested to determine which updates are appropriate for the data processing devices associated with the at least one remote proxy server. Thereafter, software updates are selectively pushed from the primary server to the at least one proxy server, along with an associated installation script, in accordance with a received login request and in accordance with associated registration data.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

Figure 1:
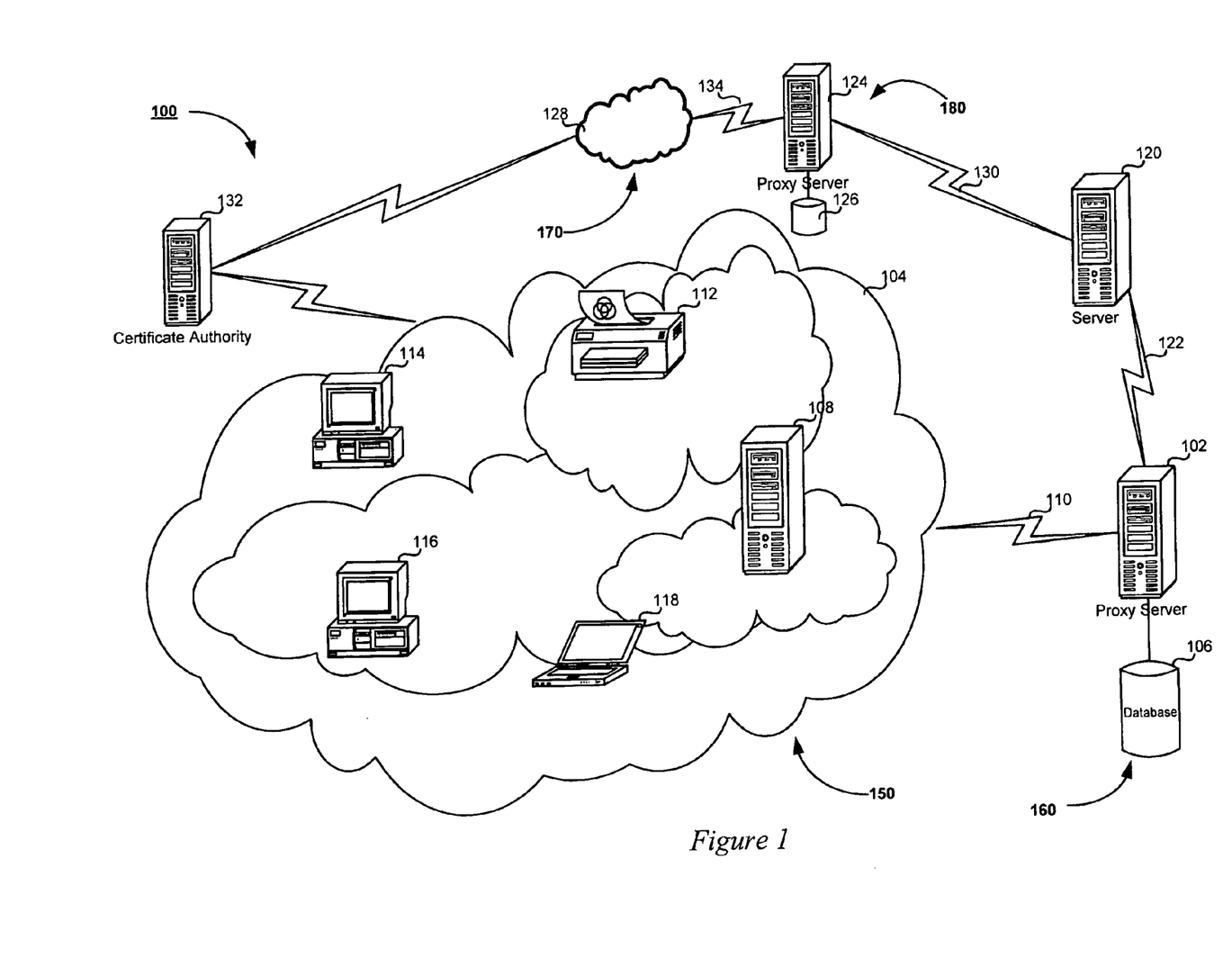
FIG. 1 is a block diagram of an exemplary system according to the present invention.

Turning now to the drawings wherein the illustrations are for illustrating the preferred embodiment only, and not for delivering the same. Referring to FIG. 1, there is shown an exemplary system 100 for remotely securing software updates of computer systems contemplated by the present invention. The system 100 comprises a first customer site 150, a second customer site 170, remote proxy sites 160 and 180, a certificate authority 132, and a primary server 120. The remote proxy sites 160 suitably comprise databases 106 and 126, communicatively coupled to respective proxy security hot fix servers 102 and 124. In one embodiment, the databases 106 and 126 contain the most current security updates, or fixes, for various components, libraries, servers and modules. The databases 106 and 126 further contain past updates or fixes, as determined by a system administrator. The proxy servers 102 and 124 may access the fixes or updates from the databases 106 and 126 either manually, at the direction of the system administrator, or automatically. In a preferred embodiment of the subject application, the fixes or updates are stored on the primary server 120 and communicated via secure communications to the proxy servers 102 and 124 for storage in their associated databases 106 and 126 for later communication to suitable devices (described below).

The customer site 150 comprises multiple systems, or data processing devices, shown in FIG. 1 as a document processing device 112, computer workstations 114 and 116, and a laptop computer 118, as well as server 108. The server 108 and each of the systems 112, 114, 116 and 118 are interconnected via a local area network 104. It will be appreciated by those skilled in the art that the inclusion of the server 108 on the local area network 104 is for illustrative purposes only and other means for generating a computer network may be used. As will be appreciated by those skilled in the art, the server 108, may be, for example an applications server, running programs which are then displayed each system 112, 114, 116, and 118, or the like. Furthermore, the server 108 may be a print server, receiving print jobs from each system 114, 116, and 118, processing the same and forwarding the processed jobs to the printer 112. Those skilled in the art will appreciate that the document processing device 112, the computer workstations 114 and 116, and the laptop computer 118 are illustrative of a plurality of various computing systems capable of connectivity to the network 104 and are intended as examples, and not limitations, of the systems associated with a customer site 150. It will be understood by those skilled in the art that the customer site 170 is also capable of including such a diverse mixture of computing equipment and for purposes of illustration only, reference is made hereinafter to the second customer site 170 including all the components 108 through 118 resident on the network 128 associated therewith.

The servers 102 and 124 at the remote proxy sites 160 and 180 are in communication with the respective local area networks 104 and 128 via communications links 110 and 134. It will be appreciated by those skilled in the art that the communications links 110 and 134 may be any form of connection between the proxy servers 102 and 124 and the local area networks 104 and 128, including, but not limited to a direct connection, connection via the Internet or intranet, dial-in or other suitable means of connecting a remote computer to a network.

In a preferred embodiment, the communications links 110 and 134 are secure connections using hypertext transfer protocol, or HTTP. The security of the communications links 110 and 134 are suitably via a secure sockets layer, or SSL. It will be appreciated by those skilled in the art that other secured transmission protocols for securely connecting and registering the proxy servers 102 and 124 with the local area networks 104 and 128 may be used and the present invention need not be limited to the use of SSL encryption and security measures.

At the customer site 150, a system administrator will register each system 112, 114, 116, and 118 with the proxy server 102 to receive hot fixes. The skilled artisan will appreciate that a similar process described hereinafter with respect to the first customer site 150 also occurs with respect to the second customer site 170 and the proxy server 124. In other words, the system administrator establishes a secure connection 110 from the server 108, or the network 104 to the proxy server 102 using SSL over HTTP and registers each system 108, 112, 114, 116, and 118. As part of the registration process, the system administrator at the customer site 150 provides, or allows each system 112, 114, 116, and 118 to provide model number, version of software and the like. During the registration process, the system administrator at the customer site 150 selects preferences, such as when to receive uploads, manual or automatic application of the updates or fixes, and the like. It is while registering each system 108, 112, 114, 116, and 118 that the customer site 150 system administrator gives appropriate credentials to the proxy server 102 to enable authentication with each system 108, 112, 114, 116, and 118 on the local area network 104. As will be appreciated by those skilled in the art, suitable credentials may, for example be a username and password combination, digital certificate, digital signatures or other verification means. The skilled artisan will understand that the method of authenticating the proxy server 102 need not be limited to the use of a username and/or password.

In a preferred embodiment, the remote proxy site 160 is linked to the customer site 150 though a secured private port, whereby each system 108, 112, 114, 116, and 118 of the customer site 150 will automatically receive the latest updates and patches of the services that are running. The proxy server 102 uses the secured private port to transfer the updates stored the database 106 to the system or systems that have subscribed to an update service provided by the remote proxy site 160. It will be appreciated by those skilled in the art that the remote proxy site 160 is depicted in FIG. 1 has comprising a proxy server 102 and database 106 for illustration purposes only. The skilled artisan will understand that various other components are also capable of implementation at the proxy site 160, e.g. administrative devices (not shown), billing devices (not shown), and the like. As will be understood in the art, the updates, patches, or fixes will be pushed to each system 112, 114, 116, and/or 118 requiring the update, provided such a system is subscribing to the service hosted by the proxy server 102 at the remote proxy site 160.

The primary server 120 is suitably configured to provide software updates to each proxy server 102 and 124 for use in providing such software to customer sites 150 and 170. Thus, the primary server 120 is in secure data communication with each proxy server 102 and 124 via secure communications links 122 and 130 respectively. The skilled artisan will appreciate that such secure communications links 122 and 130 include, for example and without limitation, SSL or other secured transmission protocols for securely connecting devices, as will be known in the art. Each proxy server 102 and 124 is suitably equipped to communicate status, logs, tracking data, and the like, to the primary server 120, which stores such information, thereby enabling the primary server 120 to log updates communicated to each proxy server 102 and 124.

According to one embodiment of the subject application, the system 100 includes a certificate authority 132 in data communication with networks 128 and 104. Preferably, such an authority 132 provides authentication services of digitally signed updates devices on the networks 104 and 128 receive prior to implementation thereof. The skilled artisan will appreciate that the digital signing of software updates is capable of occurring at the primary server 120, the proxy servers 102 and 124, or both, whereupon the proxy servers 102 and 124 verify the authenticity of updates received from the primary server 120 via the certificate authority 132. The foregoing system may best be understood with reference to the subsequent figures, describing the method and implementation of the present invention.

Figure 2:
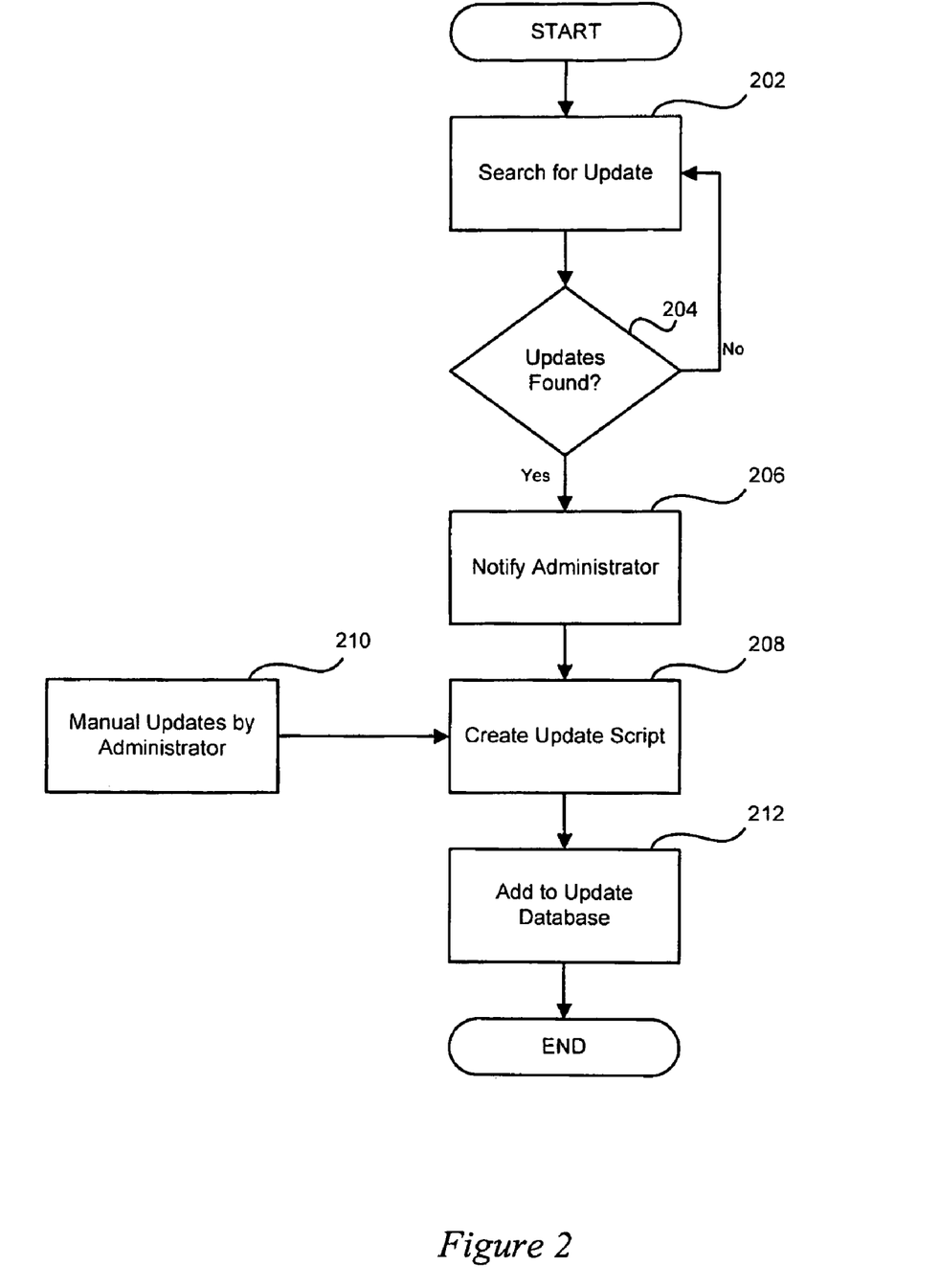
FIG. 2 is a flowchart illustrating the determining the availability of a software update according to the present invention.

Turning now to FIG. 2, there is shown a flow chart depicting the operation of one aspect of the present invention. As shown in FIG. 2, there is a method for searching for updates or fixes that necessitate being uploaded to a subscribing system. In one embodiment, a daemon residing on the host server 102 performs the search for updates visualized in FIG. 2. The skilled artisan will appreciate that a daemon, as contemplated in this embodiment, is a networking program that performs a housekeeping or maintenance utility function without being called by a user. A daemon sits in the background and is activated only when needed, for example, to correct an error from which another program cannot recover. Running in the background of the host server 102, the search for update daemon, or search daemon, searches for updates beginning at step 202. When an update is uncovered by the search daemon at step 204, the system administrator for the remote proxy site 160 is notified of the discovery at step 206.

In the event that an update has not been found at step 204, the search daemon resumes searching for an update by returning to step 202. After the notification to the administrator at step 206, the search daemon creates an update script at step 208. As will be understood by those skilled in the art, the update script is suitably written in a language that the program to be updated or patched understands, thereby obviating the need to compile the script into object code for execution. It will further be appreciated herein that the search daemon need not solely be responsible for uncovering new updates or patches.

As shown in FIG. 2, at step 210, the remote proxy site 160 system administrator generates or otherwise inputs an update, patch or fix to the host server 102. These manual updates are subsequently detected by the search daemon and at step 208, the manual updates are transformed into update scripts. It will be understood by those skilled in the art that the generation of the update scripts may be accomplished by the search daemon or by the remote proxy site 160 system administrator, either process being acceptable to the operation of the subject invention. Irrespective of manual or automatic detection of updates, the new script is added to the update database 106 for later uploading, or pushing, to a subscribing system. The update scripts, or installation scripts, act to apply the updates, patches or fixes to the subscribing system. In accordance with the present invention, all installation scripts will be tested and verified prior to uploading the same to the subscribing system. Upon completion of the steps outlined in FIG. 2, the search daemon on the host server 102 has updated the database 106 with the most current updates, patches or fixes.

Figure 3:
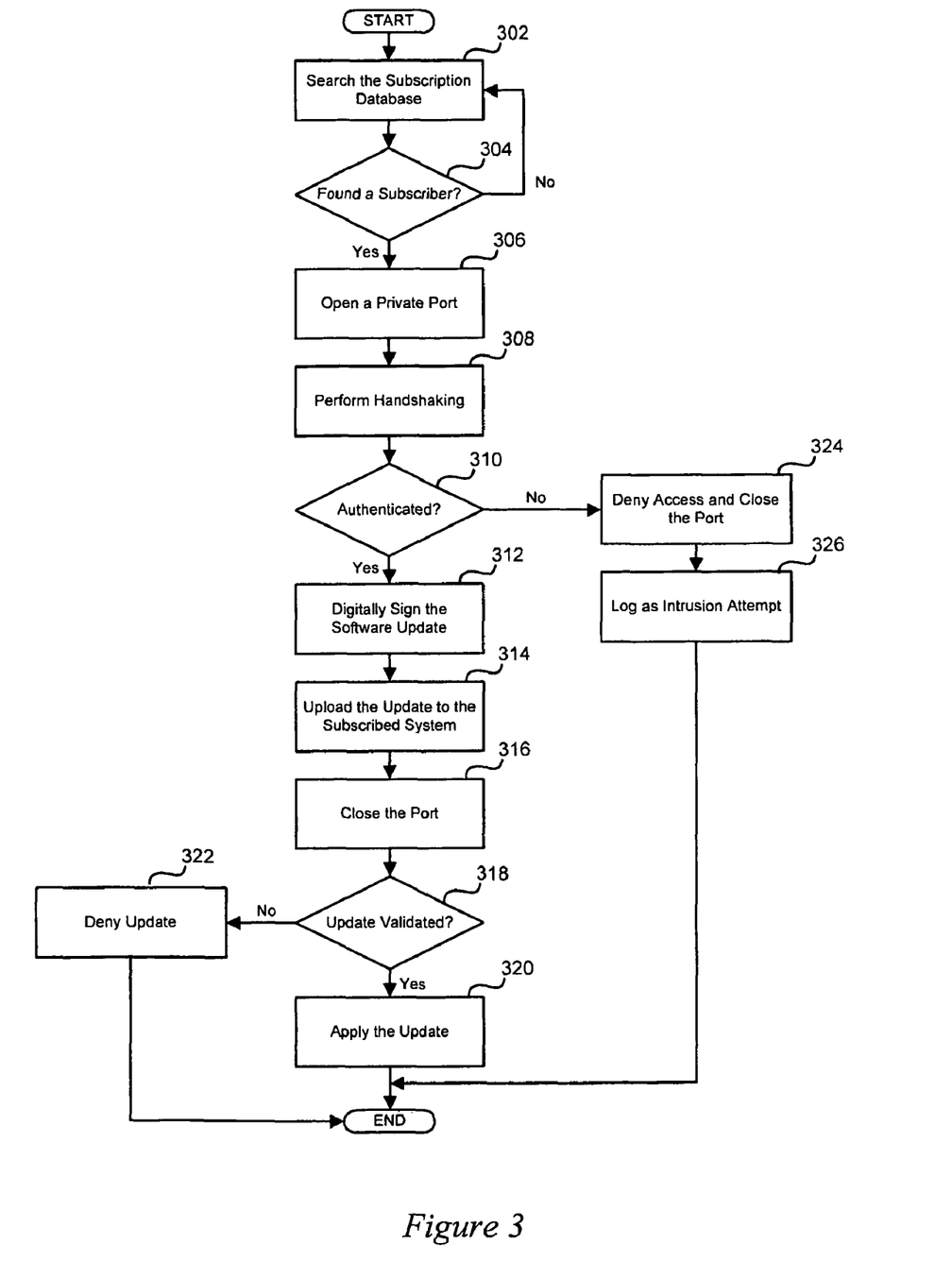
FIG. 3 is a flowchart illustrating the method of providing software updates to a remote computer system.

Referring now to FIG. 3, there is shown a flow chart representative of the method of the present invention, whereby the most current updates, patches or fixes are pushed, that is uploaded, to a subscribing system. Beginning at step 302, a search of the subscription database 106, is conducted, looking for a subscriber. It will be appreciated that the database 106, referenced above as an update database, may also incorporate the subscription database on the same drive. It will further be appreciated that the use of the reference number 106, with respect to FIG. 1, is to facilitate the visualization of the system 100 and not to limit the system 100 to a single database. Rather, the depiction of the database 106 is meant to illustrate a hardware configuration containing one or more databases.

In a preferred embodiment, the search for a subscriber is conducted by an update daemon, separate from the search daemon. It will be appreciated by those skilled in the art that the update daemon and the search daemon may be either separate or a single program. Either configuration for the daemons will allow the subject invention to function in accordance with the method described herein. Turning to step 304, a determination is made that a subscriber has been found by the update daemon. When, at step 304, no subscriber is found, the search will continue by returning to step 302. After positive determination of the existence of a subscriber at step 304, the daemon proceeds to direct the host server 102 to activate, or open, a private port from the remote proxy site 160 to the customer site 150. As discussed previously, the private port enables direct contact between each of the systems 108, 112, 114, 116, and 118 and the host server 102.

At step 308, the host server 102, at the direction of the update daemon, conducts a handshaking procedure with the customer site 150. As will be understood by those skilled in the art, a handshaking procedure utilizes the username/password authentication procedures, or other means of verifying the rights of the host server 102 to upload updates. The subscribing system of the customer site 150 then determines at step 310 whether or not the host server 102 has provided sufficient authentication to access the customer site 150. A negative determination at step 310 directs the customer site 150 to deny access and close the private port at step 324. With the connection between the remote proxy site 160 and the customer site 150 terminated at step 324, the subscribed system of the customer site 150 logs the failed attempt as an intrusion attempt at step 326 and provides notification to the customer site 150 system administrator of the attempt.

However, if at step 310 the subscribing system of the customer site 150 determines that the remote proxy site 160 has provided sufficient proof of authentication, the remote proxy site 160 then digitally signs the software update at step 312. It will be appreciated by those skilled in the art that the digital signing of step 312 is capable of being bypassed when the primary server 120 previously signed the update prior to communication thereof to the proxy server 102. Thus, software update is signed prior to the communication of the update to the customer site 150. At step 314, the customer site 150 allows the update daemon to upload, or push, the scripts containing the updates, fixes or patches to the subscribing system. The update daemon then directs the host server 102 to close the private port at step 316 and logs the transaction in the database 106 to prevent subsequent uploads of the same updates, patches or fixes. The subscribing system of the customer site 150 will then determine at step 318 whether the software update is valid, i.e. whether the certificate authority 132 has validated the digitally signed update. Upon a determination at step 318 that the software update has not been validly signed, operations proceed to step 322, whereupon the update is denied and not installed by the subscribing system of the customer site 150. Thereafter, operations with respect to FIG. 3 terminate. Upon a determination at step 318 that the digital signature of the software update is valid, flow proceeds to step 320, whereupon the subscribing system of the customer site 150 applies the update. It will be appreciated that the application of the update may be accomplished by the subscribing system of the customer site 150 running the installation script automatically or by notifying the customer site 150 system administrator of the uploaded update and allowing the administrator to apply the update at a more convenient time.

Figure 4:
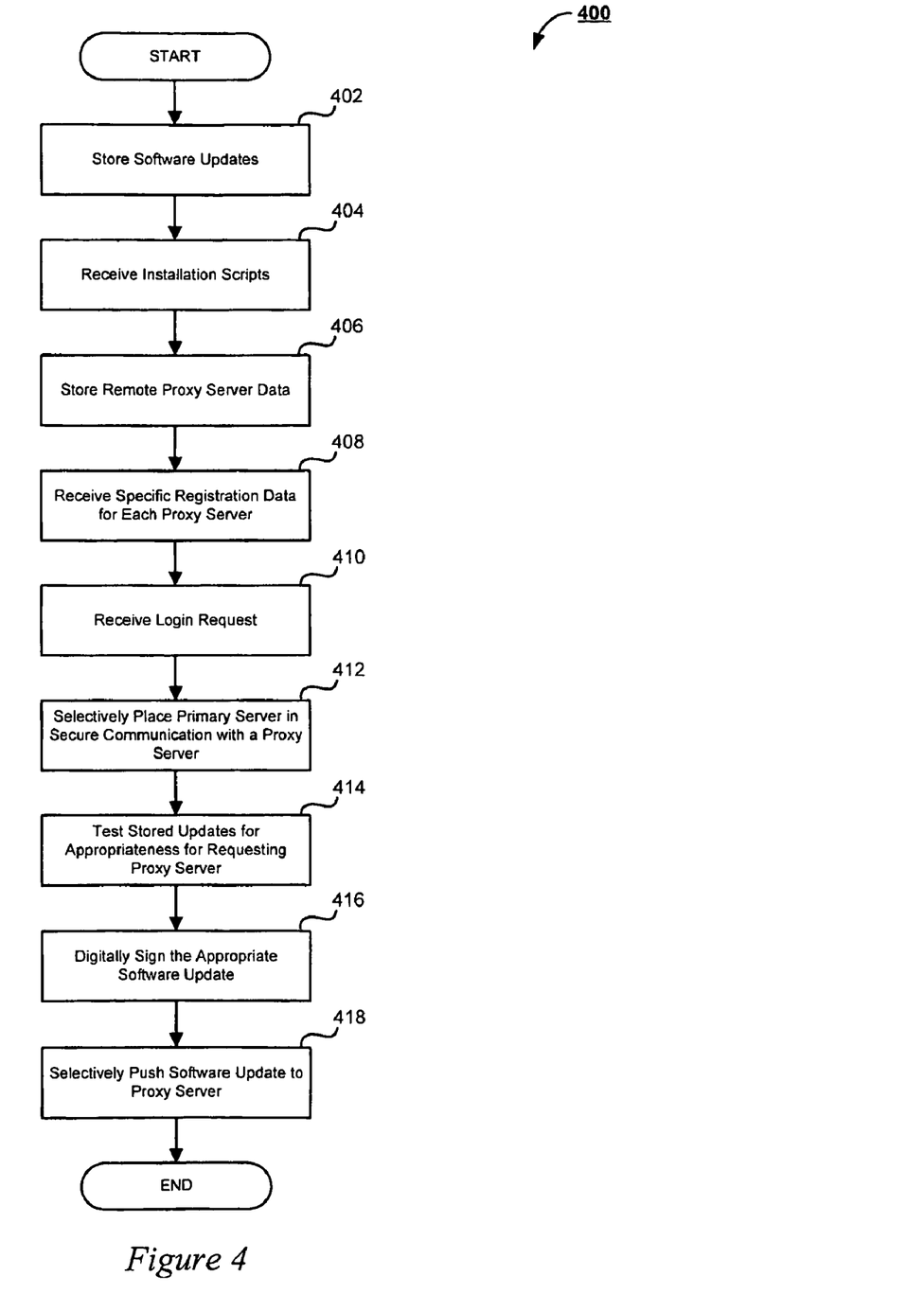
FIG. 4 is a flowchart illustrating the method for updating security software of computer systems via a remote software update source in accordance with one embodiment of the subject application.

Turning now to FIG. 4, there is shown a flowchart 400 illustrating a method for updating security software of computer systems via a remote software update source in accordance with one embodiment of the subject application. The method of FIG. 4 begins at step 402, whereupon software updates representing at least one software update associated with at least one data processing device, e.g. the systems 112, 114, 116, or 118 associated with the customer site 150, are stored on a primary server 120. It will be appreciated by those skilled in the art that such updates include, for example and without limitation, patches, security fixes, upgrades, and the like. At step 404, installation scripts are received at the primary server 120, each of which is associated with at least one software update stored on the server 120. The skilled artisan will appreciate that such scripts are capable of implementation by a variety of data processing devices, as are known in the art.

Operations then proceed to step 406, whereupon data representing each remote proxy server 102 and 124 are stored in a secure data storage associated with the primary server 120. It will be appreciated by those skilled in the art that suitable remote proxy data includes, for example and without limitation, network address, designation, subscriber information, and the like. At step 408, specific registration data is received by the primary server 120 from each of the remote proxy servers 102 and 124 that includes data representing each data processing device associated with a respective remote proxy server 102 or 124. Preferably, the registration data includes authentication credentials for establishment of a secure data communication path between the primary server 120 and each of the remote proxy servers 102 and 124. The registration data also includes software identification data corresponding to the identification of software of the data processing devices, e.g. the systems 112-118 of the customer site 150, associated with the specific remote proxy server 102 or 124, and update parameter data corresponding to specified timing for updating software updates. Preferably, the registration data also includes data corresponding to selective manual and automatic installation of software updates.

At step 410, the primary server 120 receives a login request from one of the remote proxy servers 102 or 124 and then compares the received login request with the proxy server data. The primary server 120 is then selectively placed in secure data communication with the proxy server 102 or 124 requesting login at step 412 based upon the results of the comparison at step 410. Preferably, the secure communications channel is established in accordance with the registration data, as will be appreciated by those skilled in the art. At step 414, the stored updates are tested to determine which updates are appropriate for the data processing devices 112-118 associated with the requesting proxy server 102 or 124. The appropriate software is then digitally signed at step 416 by the primary server 120 for later validation via the certificate authority 132. It will be appreciated by those skilled in the art that the step of digitally signing the appropriate software is illustrated in FIG. 4 for example purposes only, and the subject application is capable of implementation without necessitating the step of digitally signing the appropriate software updates. Operations then proceed to step 518, whereupon the primary server 120 then selectively pushes appropriate software updates and an associated installation script to the requesting proxy server 102 or 124 based upon the received login request and associated registration data.

Figure 5:
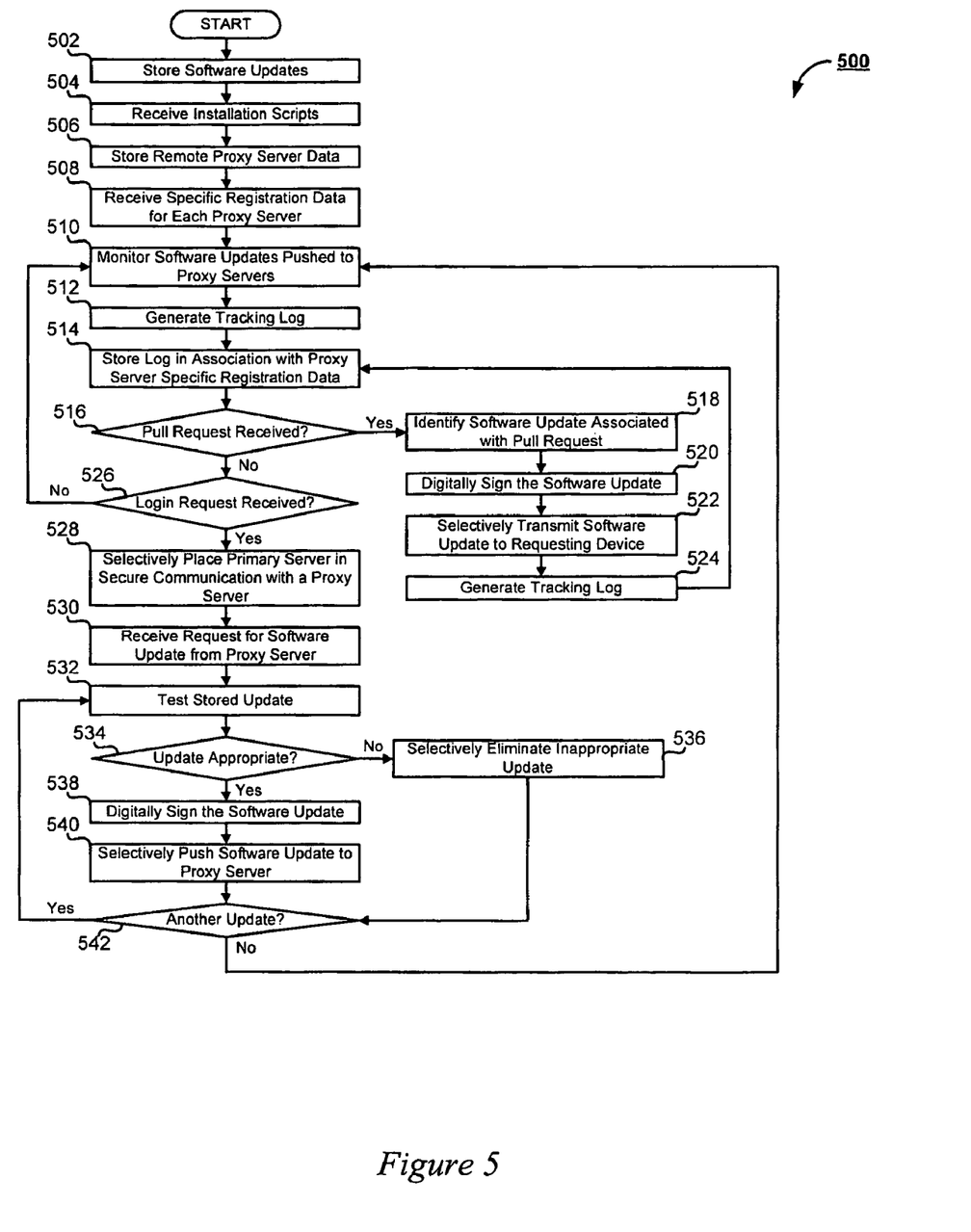
FIG. 5 is a flowchart illustrating the method for updating security software of computer systems via a remote software update source in accordance with one embodiment of the subject application.

Referring now to FIG. 5, there is shown a flowchart 500 illustrating one example embodiment of the method for updating security software of computer systems via a remote software update source. The methodology of FIG. 5 begins at step 502, whereupon the primary server 120 stores multiple software updates for software resident on a plurality of various computer systems, e.g. the data processing, or computing systems 112, 114, 116, and 118 of FIG. 1. At step 504, the primary server 120 receives multiple installation scripts, each of which is associated with the installation of at least one software update. The skilled artisan will appreciate that each script is capable of facilitating the installation of a single update, or multiple updates, patches, fixes, or the like of software of a data processing device, i.e. the systems 112-118. The primary server 120 further stores proxy server data corresponding to subscribing proxy servers 102 and 124 in an associated secure data storage at step 506.

Specific registration data is then received from each proxy server 102 and 124 by the primary server 120 at step 508. Preferably, the specific registration data of each remote proxy server 102 and 124 includes data representing each data processing device respectively associated therewith. In such an embodiment, the registration data also includes authentication credentials for secure communications, software identification, update parameter data, and data corresponding to selective manual and automatic installation of software updates. At step 510, the primary server 120 begins monitoring the software updates selectively pushed to each of the remote proxy servers 102 and 124. At step 512, a tracking log is generated by the primary server 120 corresponding to the results of the monitoring of step 510. The tracking log is then stored by the primary server 120 in association with the registration data specific to each of the remote proxy servers 102 and 124 at step 514.

Operations then proceed to step 516, whereupon a determination is made whether a pull request has been received via a proxy server 102 or 124, or via an associated data processing device 112-118. It will be appreciated by those skilled in the art that such a pull request is capable of originating from the proxy server 102 or 124 pursuant to a request by a data processing device 112-118, or via the proxy server 102 or 124 so as to have such updates ready for communication to data processing devices at a preselected time. When it is determined at step 516 that a pull request has been received, flow proceeds to step 518. At step 518, the software update associated with the pull request is identified by the primary server 120. In accordance with one embodiment, the pull request is received by the proxy server 102 or 124, whereupon the data processing device 112-118 submits the pull request. The identified software update is then digitally signed at step 520 so as to enable validation of the update by the receiving device 112-118 with the certificate authority 132 prior to installation thereby. At step 522, the identified software is selectively transmitted to the requesting device and a tracking log is generated at step 524 in accordance with the software update transmitted at step 522. Thereafter, flow returns to step 514, whereupon the log is stored on the primary server 120.

Upon a determination at step 516 that a pull request has not been received, flow proceeds to step 526. At step 526, a determination is made whether a login request has been received from at least one of the proxy serves 102 or 124. When no login request has been received, operations return to step 510, whereupon the primary server 120 continues the monitoring of software updates as set forth above. Upon a determination at step 526 that a login request has been received, flow proceeds to step 528. At step 528, the primary server 120 is selectively placed in secure data communication with the requesting proxy server 102 or 124 in accordance with a comparison of the login request with the proxy server data. Preferably, the secure data communication channel is established in accordance with the registration data associated with the proxy server 102 or 124 with which the primary server 120 is placed in data communication.

At step 530, the proxy server 102 or 124 is optionally capable of requesting a specific software update for a particular data processing device 112-118 needing such an update. The skilled artisan will appreciate that step 530 is representative of one embodiment of the subject application, and the methodology of FIG. 5 is equally capable of implementation without having a software update specified by a requesting proxy server 102 or 124. Following receipt of such request, flow proceeds to step 532, whereupon a stored update is tested to determine whether the update is appropriate for the data processing devices 112-118 associated with the requesting proxy server 102 or 124. In accordance with a preferred embodiment of the subject application, the testing performed at step 532 further tests the available update against stored log data, so as to determine whether the update has already been communicated to the requesting proxy server 102 or 124.

A determination is then made at step 534 whether the software update is appropriate in accordance with the testing performed at step 532. Upon a determination at step 532 that the software update is not appropriate, flow proceeds to step 536, whereupon the software update is selectively eliminated from being pushed to the requesting proxy server 102 or 124. Operations then proceed to step 542, whereupon a determination is made whether any additional software updates remain available for the requesting proxy server 102 or 124. When no additional updates are available, operations with respect to FIG. 5 return to step 510 for monitoring by the primary server 120. Upon a determination at step 542 that additional software updates are available, flow returns to step 532, whereupon the additional software is tested to determine, at step 534, whether the software update is appropriate. Upon a determination that the software update is appropriate for the requesting proxy server 102 or 124, flow proceeds to step 538.

At step 538, the software update is digitally signed so as to enable authentication with the certificate authority 132 prior to the installation thereof by the proxy server 102 or 124, or the designated data processing device 112-118. The digitally signed software update is then selectively pushed by the primary server 120 to the proxy server 102 or 124 at step 540. Operations then proceed to step 542, whereupon a determination is made whether any additional software updates are available. Upon a determination at step 542 that no additional software updates are available, operations return to step 510, whereupon the primary server 120 continues to monitors software updates as set forth above. In accordance with one embodiment of the subject application, the data processing device 112-118 receives the software update from the proxy server 102 or 124 via the corresponding network 104 or 128. Thereafter, the data processing device 112-118 validates the digital certificate, or signature, associated with the update via the certificate authority 132. Upon a determination that the certificate is valid, i.e. a validly signed update, the data processing device, i.e. the system 112, 114, 116, or 118 installs the update.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for updating security software of computer systems via a remote software update source, comprising the steps of:
    a primary server adapted to store software updates representative of at least one update of software associated with at least one data processing device;
    means adapted for receiving installation scripts, each of which is associated with at least one software update disposed on the primary server;
    secured data storage means for storing data representative of a plurality of remote proxy servers;
    registration means, disposed in the primary server, adapted for receiving specific registration data from each of the plurality of remote proxy servers inclusive of data representative of a plurality of associated data processing devices associated therewith, wherein the registration data includes:
        authentication credentials for establishing a secure data communication path between the server and each of the plurality of remote proxy servers,
        identification data corresponding to identification of software of the data processing devices associated with the specific remote proxy server,
        update parameter data corresponding to specified timing of software updates, and
        data corresponding to selective manual and automatic installation of software updates;
    authentication means adapted for receiving a login request from at least one of the plurality of remote proxy servers including means for comparing the received login request with the proxy server data;
    means for selectively placing the primary server in secure data communication with the at least one requesting proxy server in accordance with the comparison means, wherein a secure data communication channel is established in accordance with the registration data;
    means adapted for testing stored updates to determine which updates are appropriate for the data processing devices associated with the at least one remote proxy server; and
    means adapted for selectively pushing software updates from the primary server to the at least one proxy server to be sent to at least one device, along with an associated installation script, in accordance with a received login request and in accordance with associated registration data.

2. The system of claim 1, further comprising means for digitally signing the determined updates for the data processing devices prior to the communication thereof to the remote data processing device.

3. The system of claim 2, further comprising:
    means adapted for monitoring the software updates selectively pushed to each of the plurality of remote proxy servers;
    means adapted for generating log data representative, for each of the plurality of remote proxy servers, representative of the software updates selectively pushed in accordance with an output of the monitoring means; and
    storage means for storing the generated log data in association with the registration data specific to each of the plurality of remote proxy servers.

4. The system of claim 3, further comprising:
    means for testing log data against stored updates to determine which updates are appropriate for the data processing devices associated with the at least one remote proxy server; and
    means for selectively eliminating at least one software update to be pushed by the primary server upon a determination from the log testing means that the software has previously been pushed to the at least one proxy server.

5. The system of claim 3, further comprising:
    means for receiving, at the primary server from at least one of the plurality of proxy servers, request data representative of at least one software update associated with at least one data processing device associated with the at least one proxy server; and means for selectively pushing, by the primary server, the at least one requested software update to the at least one proxy server.

6. The system of claim 3, further comprising:

means for receiving, disposed at least one of the plurality of proxy servers, a software update request from at least one associated data processing device in accordance with a preselected schedule associated therewith;

identification means for identifying at least one software update received by the proxy server from the primary server associated with the at least one associated data processing device; and means for selectively pulling, disposed on the at least one data processing device, the at least one identified software update from the proxy server.

7. The system of claim 6, further comprising:

means for authenticating the at least one software update pulled from the proxy server via an associated certification authority; and installation means adapted for installing the software update on the at least one data processing device upon an authentication of the software update by the associated certification authority.

8. The system of claim 6, further comprising:

means for monitoring the software updates selectively pulled by the at least one data processing device; and means for generating log data representative of the selectively pulled software in association with the at data processing device by at least one of the primary server and the proxy server associated with the at least one data processing device in accordance with an output of the monitoring means.

9. A method for updating security software of computer systems via a remote software update source, comprising the steps of:

storing, at a primary server, software updates representative of at least one update of software associated with at least one data processing device;

receiving installation scripts at the primary server, each of which is associated with at least one software update disposed on the primary server;

storing data representative of a plurality of remote proxy servers in a secured data storage;

receiving specific registration data from each of the plurality of remote proxy servers inclusive of data representative of a plurality of associated data processing devices associated therewith, wherein the registration data includes:

authentication credentials for establishing a secure data communication path between the server and each of the plurality of remote proxy servers, identification data corresponding to identification of software of the data processing devices associated with the specific remote proxy server, update parameter data corresponding to specified timing of software updates, and data corresponding to selective manual and automatic installation of software updates;

receiving a login request from at least one of the plurality of remote proxy servers and comparing the received login request with the proxy server data;

selectively placing the primary server in secure data communication with the at least one requesting proxy server in accordance with the comparison, wherein a secure data communication channel is established in accordance with the registration data;

testing stored updates to determine which updates are appropriate for the data processing devices associated with the at least one remote proxy server; and selectively pushing software updates from the primary server to the at least one proxy server to be sent to at least one device, along with an associated installation script, in accordance with a received login request and in accordance with associated registration data.

10. The method of claim 9, further comprising the step of digitally signing the determined updates for the data processing devices prior to the communication thereof to the remote data processing device.

11. The method of claim 10, further comprising the steps of:

monitoring the software updates selectively pushed to each of the plurality of remote proxy servers;

generating log data representative, for each of the plurality of remote proxy servers, representative of the software updates selectively pushed in accordance with an output of the monitoring step; and storing the generated log data in association with the registration data specific to each of the plurality of remote proxy servers.

12. The method of claim 11, further comprising the steps of:

testing log data against stored updates to determine which updates are appropriate for the data processing devices associated with the at least one remote proxy server; and selectively eliminating at least one software update to be pushed by the primary server upon a determination from the log testing that the software has previously been pushed to the at least one proxy server.

13. The method of claim 11, further comprising the steps of:

receiving, at the primary server from at least one of the plurality of proxy servers, request data representative of at least one software update associated with at least one data processing device associated with the at least one proxy server; and selectively pushing, by the primary server, the at least one requested software update to the at least one proxy server.

14. The method of claim 11, further comprising the steps of:

receiving, at the proxy server, a software update request from at least one associated data processing device in accordance with a preselected schedule associated therewith;

identifying at least one software update received by the proxy server from the primary server associated with the at least one associated data processing device; and selectively pulling, by the at least one data processing device, the at least one identified software update from the proxy server.

15. The method of claim 12, further comprising the steps of:

authenticating the at least one software update pulled from the proxy server via an associated certification authority; and installing the software update on the at least one data processing device upon an authentication of the software update by the associated certification authority.

16. The method of claim 14, further comprising the steps of:
monitoring the software updates selectively pulled by the at least one data processing device; and
generating log data representative of the selectively pulled software in association with the at data processing device by at least one of the primary server and the proxy server associated with the at least one data processing device in accordance with an output of the monitoring step.

* * * * *